…

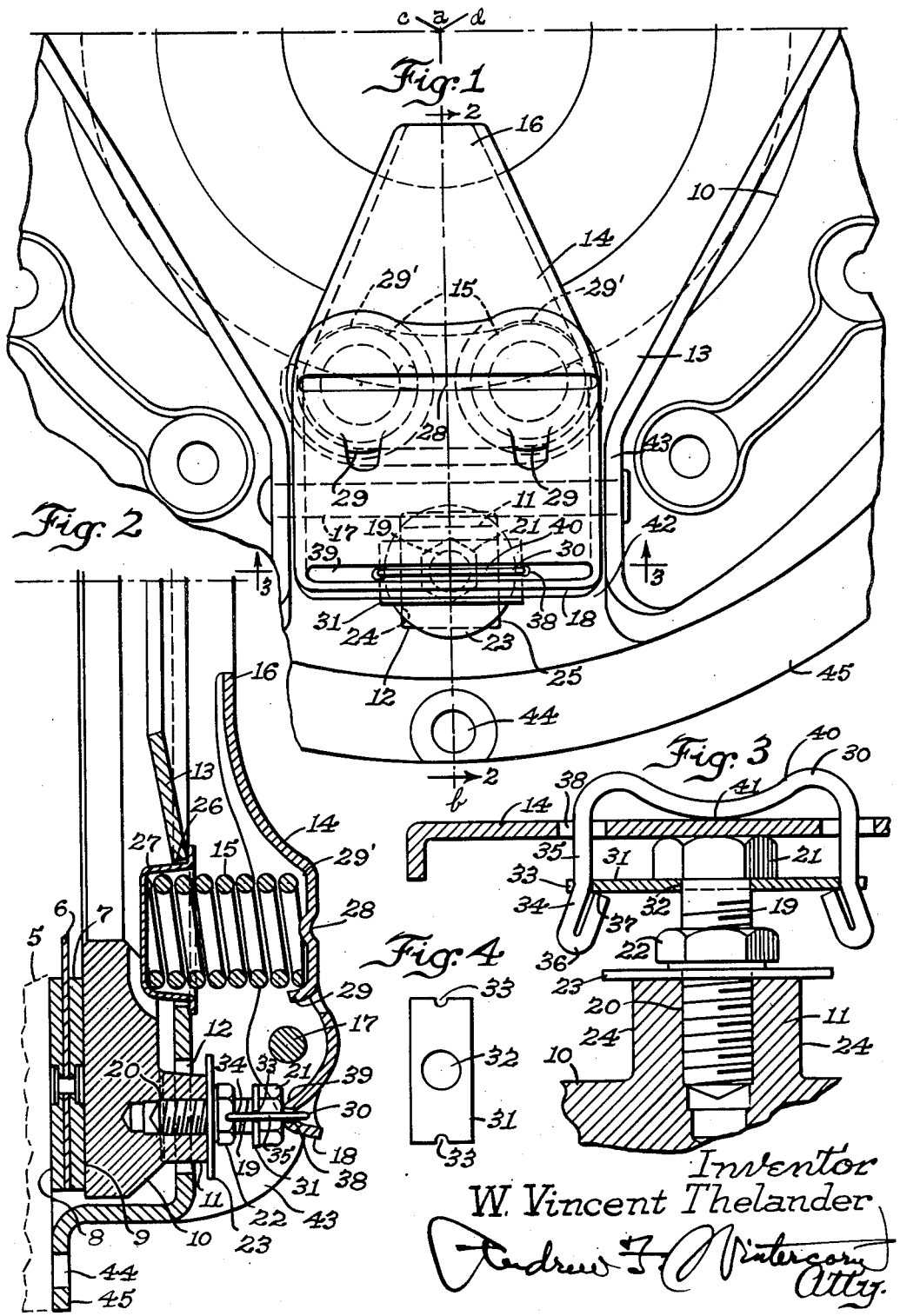

United States Patent Office 2,791,307  
Patented May 7, 1957

2,791,307

FRICTION CLUTCH AND RELEASE LEVER MOUNTING

W. Vincent Thelander, Toledo, Ohio, assignor to Dana Corporation, Toledo, Ohio, a corporation of Virginia Application March 8, 1952, Serial No. 275,633

14 Claims. (Cl. 192—99)

This invention relates to friction clutches for use on automobiles, tractors, and other vehicles, and suitable also for industrial applications.

In clutches like that disclosed in my Patent 2,214,780, issued September 17, 1940, the pressure plate is moved toward engaged position by novel spring-pressed release levers and is moved toward disengaged position by spring means acting between the back plate and drive lugs on the pressure plate. However, these lugs projecting through openings in the back plate with a predetermined operating clearance caused an objectionable rattle unless special provisions were made to eliminate the hammer noise. An example of such special provisions is disclosed in Patent 2,515,277, issued to E. M. DeCoursey and me on July 18, 1950.

In my copending applications, Serial No. 656,327, filed March 22, 1946, now Patent No. 2,589,308 and Serial No. 244,174, filed August 29, 1951, now Patent No. 2,738,850, I disclosed constructions constituting other solutions to the problem. In those constructions leaf springs are provided between the radially inner portion of the back plate and the back of the pressure plate to transmit drive from the back plate to the pressure plate and keep the latter centered relative to the back plate, these leaf springs serving also to keep the pressure plate in assembled relation to the back plate in the shipment of the clutch from the plant of the clutch manufacturer to the plant of the automobile manufacturer, so that it is ready for installation upon arrival. Those designs, however, are still fairly complicated and expensive and it is therefore the principal object of my invention to provide another design that is simpler and less expensive, this design eliminating the leaf springs which represented a sizable fraction of the cost.

In the present design the pressure plate has drive lugs slidable in holes in the back plate, and these lugs have the usual adjusting screws thereon for engagement with the release levers carried on the back plate, and return links are provided, one in connection with each of the release levers, detachably pivotally connecting the outer ends thereof to the heads of the adjusting screws in such a way that the screws can be adjusted whenever necessary, without disconnecting the release levers therefrom, the return links also serving as friction drag means to frictionally resist lateral movement of the screw heads relative to the levers so as to keep the lugs on the pressure plate from hamemring on the sides of the holes in the back plate. Each return link, in order to add resilience to the friction drag function and eliminate play in the pivotal connection and accordingly reduce likelihood of chatter and noise, is preferably in the form of a generally U-shaped wire spring that has an inwardly bowed cross-portion for abutment with the back of the release lever and has the end portions of the arms of the U bent in outwardly diverging relation and bent upon themselves to define shoulders which, when the arms are extended through holes in the release lever and through notches in the ends of a spring steel retainer plate mounted on the adjusting screw under the head thereof, are adapted to snap into place behind the retainer plate to tie the release lever detachably and pivotally to the head of the adjusting screw and yet securely enough so that there is no danger of the return link becoming disconnected in the operation of the clutch at the highest speeds, not even when a wrench is applied to the head of the adjusting screw to turn it in a takeup adjustment.

The invention is illustrated in the accompanying drawing, in which—

Fig. 1 is a rear view of a clutch embodying my invention, only one of three release levers that are provided being shown, and the return link connecting the release lever with the head of the adjusting screw on the pressure plate;

Fig. 2 is a section on the line 2—2 of Fig. 1;

Fig. 3 is a section on the line 3—3 of Fig. 1 on a larger scale; and

Fig. 4 is a view of the retainer plate removed and shown on the same scale as it appears in Figs. 1 and 2.

The same reference numerals are applied to corresponding parts in these four views.

Referring to Figs. 1 and 2, the reference numeral 5 is applied to a flywheel mounted on the rear end of the usual engine crank shaft and forming the driving element. 6 designates a clutch disk having the usual facings 7 for engagement with the flat back face 8 on the flywheel and the flat front face 9 on the pressure plate 10, the disk 6 being mounted in the usual way by means of a hub portion splined on the front end of a shaft constituting the driven element and extending rearwardly from the clutch into the gear box of the transmission in the usual way. The clutch illustrated is like that disclosed in my Patent No. 2,214,780, mentioned above, but it should be understood that the present invention is not limited to that particular clutch but may be used on any friction clutch where a similar problem of providing anti-rattle means is presented; that is to say, in any friction clutch wherein the pressure plate has rearward projections or drive lugs like that indicated at 11, projecting through openings like that indicated at 12, in a back plate like that indicated at 13, or in back plate segments, bearing in mind that in an earlier Thelander et al. 1,985,301, issued December 25, 1934, the conventional back plate was eliminated in one form, and a number of separate brackets fastened to the flywheel were substituted, each bracket forming what was called a lever support. In accordance with the two patents mentioned, a plurality of release levers 14 are provided which are arranged to be depressed against the action of compression springs 15 by clutch pedal operation of a throw-out bearing (not shown) against the inner ends 16 of the levers to disengage the clutch. These levers are pivoted on cross-pins 17 near their outer ends 18 to transmit pressure of the spring 15 in a multiplied degree to the pressure plate 10, and, although the pressure of the springs 15 is multiplied through the levers 14 for clutch engagement, it is apparent that there is an appreciable mechanical advantage in the disengagement of the clutch by reason of the fact that the springs 15 are closer to the pivots 17 than the inner ends 16 of the levers where the throw-out bearing engages, thus making for lighter pedal action. This arrangement is also of advantage from the standpoint that there is very little loss of spring pressure when the clutch facings 7 become worn, because so little expansion of the springs is permitted for a given amount of wear of the facings. The lugs 11 have screws 19 threaded in longitudinal holes 20 provided therein, and, when the heads 21 of the screws 19 are properly adjusted relative to the outer ends 18 of the levers 14, lock nuts 22 on the shanks of the screws 19 are tightened to lock the screws in adjusted position. In taking up for wear on the facings 7, the screws 19 are backed up a turn or so after the lock nuts 22 have been loosened, and when the correct relationship of the clutch parts has been restored in that way, the screws 19 are locked again in adjusted position by tightening the nuts 22. Washers 23 are held in place on the adjusting screws 19 on lugs 11 by lock nuts 22, and these washers are adapted to serve by abutment with the back plate 13 to limit the movement of the pressure plate 10 away from the back plate when the clutch assembly is being shipped from the plant of the clutch manufacturer to the plant of the automobile manufacturer, so as to keep the springs 15 caged under the release levers 14 and make the clutch ready for installation upon arrival at its destination. These washers 23 play no part in the operation of the clutch otherwise.

The lugs 11, which are cast integral with the plate 10, are substantially square in cross-section and milled off flat and parallel on the opposite sides 24, the holes 12 through which the lugs 11 project being rectangular in form and having the opposite sides 25 thereof finished flat and in parallelism to one another and so spaced in relation to the width of the lugs 11 between the sides 24 to receive the lugs with an easy working fit, whereby drive is transmitted from the back plate to the pressure plate without the use of any intermediate leaf springs, such as are disclosed in the two aforementioned copending applications.

The release levers 14, in addition to applying the engaging pressure, in accordance with my present invention are equipped to serve the further functions of retracting the pressure plate in the disengagement of the clutch and reducing if not entirely eliminating hammer noise, thereby greatly improving the operation of the clutch generally. The return links 30 and cooperating retainer plates 31 for the performance of these functions add very little to the cost of manufacture of the clutch. The plates 31 are rectangular pieces of tempered spring steel, each having a center hole 32 to receive the shank of the associated screw 19, and notches 33 in the middle of each end to receive the end portions 34 of the arms 35 of the associated U-shaped return link 30 when the latter is detachably connected or coupled thereto, as shown in Fig. 3. The plate 31 is assembled on the shank of the screw 19 before the lock nut 22 is put on and hence cannot fall off even when the link 30 is not attached to it. Its springiness facilitates connection with the end portions 34 which are bent into outwardly diverging relation, as clearly appears in Fig. 3, and have their extremities bent inwardly upon themselves as indicated at 36 to define shoulders 37 that are adapted to snap into place behind the notched end portions of plate 31 to tie the inner end portion 18 of the associated release lever 14 detachably and pivotally to the head 21 of the screw 19 and yet securely enough so that there is no danger of these parts becoming disconnected in the operation of the clutch at the highest speeds, not even when a wrench is used on the head 21 of the screw 19 to turn it in a clutch takeup adjustment, the arms 35 of the link 30 being spaced far enough apart to afford ample working space on both sides of the screw head 21. The link 30 is made of spring wire stock so that the arms 35 which extend freely through holes 38 provided in the bottom of the transverse channel shaped fulcrum rib 39 that is formed on the inner end 18 of the lever 14, are adapted to be spread apart enough to let the shoulders 37 pass through notches 33, after which they snap into place behind the plate 31 to complete the connection. The angle of inclination of the shoulders 37 relative to the plane of the plate 31 is enough to insure a tight fit as these shoulders wedge inwardly into place under the plate. The springiness of plate 31 is beneficial in that respect because the notched ends of the plate will flex inwardly toward the lever 14 enough to let the shoulders 37 move home. Also, the cross-portion 40 of the U-shaped return link 30 is bowed inwardly to engage the back of lever 14 only at the mid point 41 of the cross-portion and thus permit the ends of the cross-portion to be flexed toward the lever 14 enough to let the shoulders 37 move home behind plate 31, whereby to provide a further spring pressure holding the fulcrum rib 39 of the lever in line contact pivotal engagement with the head 21 of the adjusting screw diametrically of the latter. Plate 31 is shown as straight in Fig. 3 but it will be understood that in actual practice it is flexed to some extent at both ends toward the lever 14 to equalize the spring pressure due to straightening deflection of the bowed cross-portion 40 of link 30.

In operation, the lugs 11, of which there are three in 120° circumferentially spaced relation, on the same radial center lines ab, ac, and ad with three release levers 14, support the pressure plate 10 in centered relation to the back plate 13 and also transmit drive from the back plate to the pressure plate, the lugs 11 being slidable freely in holes 12 provided in the back plate so as to move to engaged position under action of springs 15 and to disengaged position under action of release levers 14. Positive return of the pressure plate upon disengagement of the clutch is obtained by the return links 30 cooperating with the retainer plates 31, the links 30 being designed, as pointed out above, to be snapped into place in the assembling of the clutch and yet be attached securely enough so that there is no danger of accidental disconnection at high engine speeds, nor even when a wrench is applied to the head 21 of the screw 19 for adjustment of the clutch, as to compensate for wear of the facings 7 on the clutch plate 6. The return links 30 also constitute resilient friction drag means arranged to frictionally resist lateral movement of the screw heads 21 relative to the cooperating ends of levers 14 enough to prevent hammer noise. The construction is also advantageous in the shipment of the clutch assembly because the washers 23 serve by engagement with the back plate 13 as stops to limit outward movement of the pressure plate 10 away from the back plate. The clutch is well ventilated, due to the fact that the pressure plate 10 is exposed throughout the major portion of its circumference between the radially extending channel-shaped spoke portions 42 that provide the flanges 43 for support of the pivot pins 17 on which the release levers 14 are mounted, these spoke portions being attached to the flywheel by screws entered in holes 44 provided in the peripheral attaching flange portion 45 that interconnects the outer ends of the spoke portions.

It is believed the foregoing description conveys a good understanding of the objects and advantages of my invention. The appended claims have been drawn to cover all legitimate modifications and adaptations.

I claim:

1. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, the same having end portions disposed adjacent the outer ends of the drive projections, the improvement which consists in the provision of means pivotally connecting the drive projections with the adjacent ends of the release levers so that the pressure plate is positively retracted by the levers upon depression of the other ends of said levers, the pivotal connecting means including friction drag means arranged to exert appreciable frictional resistance to lateral movement of the projections relative to the levers in the normal operative position of the levers, whereby to prevent hammering of the projections on the sides of the openings, said friction drag means constituting the sole anti-hammer means in said clutch.

2. In a clutch comprising, in combination, a flywheel, a back plate carried thereby, a driven member, an axially movable pressure plate having a plurality of rearwardly extending drive projections in circumferentially spaced relation received in registering openings provided therefor in said back plate, spring means to transmit engaging pressure to said pressure plate, and release levers pivoted relative to the back plate for causing disengagement of the clutch, the same having end portions disposed adjacent the outer ends of the drive projections, the improvement which consists in the provision of means flexibly connecting the drive projections with the adjacent ends of the release levers, comprising generally U-shaped return link members, one associated with each lever and related drive projection, having the cross-portion of the U straddling a portion of the end of the lever permitting pivotal movement of the latter and having the arms of the U extending toward the projection and attached to the opposite ends of an elongated plate that is rigidly supported intermediate its ends on the drive projection in transverse relation thereto, so that the lever is pivotally connected in close-coupled relation to the drive projection and the pressure plate will be positively retracted by the levers upon depression of the other ends thereof.

3. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, the same having end portions disposed adjacent the outer ends of the drive projections, the improvement which consists in the provision of means flexibly connecting the drive projections with the adjacent ends of the release levers, comprising generally U-shaped return link members, one associated with each lever and related drive projection, having the cross-portion of the U straddling a portion of the end of the lever permitting pivotal movement of the latter and having the arms of the U extending toward the projection and attached to the opposite ends of an elongated spring plate that is rigidly supported intermediate its ends on the drive projection in transverse relation thereto, the end portions of the plate being sprung toward the lever in the connection of the arms of the link therewith, so that the lever is pivotally connected in spring-tensioned, close-coupled relation to the drive projection and the pressure plate will be positively retracted by the levers upon depression of the other ends thereof, the spring-tensioned pivotal connections frictionally resisting lateral movement of the drive projections relative to the levers to prevent hammering of the projections in the openings without the use of any other anti-hammer means.

4. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means pivotally and swivelly connecting the headed ends of said screws with the adjacent ends of the release levers so that the screws are rotatably adjustable without disconnection from the levers and the pressure plate is positively retracted by the levers upon depression of the other ends of said levers, the pivotal connecting means including friction drag means arranged to exert appreciable frictional resistance to lateral movement of the screw heads relative to the levers in the normal operative position of the levers, whereby to prevent hammering of the projections on the sides of the openings, said friction drag means constituting the sole anti-hammer means in said clutch.

5. In a clutch comprising, in combination, a flywheel, a back plate carried thereby, a driven member, an axially movable pressure plate having a plurality of rearwardly extending drive projections in circumferentially spaced relation received in registering openings provided therefor in said back plate, spring means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means flexibly interconnecting the headed ends of said screws with the adjoining ends of said release levers to retract the pressure plate when the release levers are moved to disengage the clutch, said means comprising generally U-shaped return link members, one associated with each lever and related screw head, having the cross-portion of the U straddling a portion of the end of the lever permitting pivotal movement of the latter and having the arms of the U extending toward the screw head and attached to the opposite ends of an elongated plate that is rigidly supported intermediate its ends under the screw head in transverse relation to the screw, so that the lever is pivotally and swivelly connected in close-coupled relation to the screw head and the pressure plate will be positively retracted by the levers upon depression of the other ends thereof.

6. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, springs means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means flexibly interconnecting the headed ends of said screws with the adjoining ends of said release levers to retract the pressure plate when the release levers are moved to disengage the clutch, said means comprising generally U-shaped return link members, one associated with each lever and related screw head, having the cross-portion of the U straddling a portion of the end of the lever permitting pivotal movement of the latter and having the arms of the U extending toward the screw head and attached to the opposite ends of an elongated spring plate that is rigidly supported intermediate its ends under the screw head in transverse relation to the screw, the end portions of the plate being sprung toward the lever in the connection of the arms of the link therewith, so that the lever is pivotally connected in spring-tensioned, close-coupled relation to the screw head and the pressure plate will be positively retracted by the levers upon depression of the other ends thereof, the spring-tensioned pivotal connections frictionally resisting lateral movement of the screw heads relative to the levers to prevent hammering of the projections in the openings without the use of any other anti-hammer means.

7. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure from said pressure plate, and release levers pivoted relative to the back plate for causing disengagement of the clutch, the same having end portions disposed adjacent the outer ends of the drive projections, the improvement which consists in the provision of means flexibly connecting the drive projections with the adjacent ends of the release levers, comprising generally U-shaped return link members, one associated with each lever and related drive projection, having the cross-portion of the U straddling a portion of the end of the lever permitting pivotal movement of the latter and having the arms of the U extending toward the projection and attached to the opopsite ends of an elongated plate that is rigidly supported intermediate its ends on the drive projection in transverse relation thereto, the cross-portion of the U being resilient and bowed toward the lever and being subjected to deflection in the direction of straightening in the connection of the arms of the link with the plate, so that the lever is pivotally connected in spring-tensioned, close-coupled relation to the drive projection and the pressure plate will be positively retracted by the levers upon depression of the other ends thereof, the spring-tensioned pivotal connections frictionally resisting lateral movement of the drive projections relative to the levers to prevent hammering of the projections in the openings without the use of any other anti-hammer means.

8. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, the same having end portions disposed adjacent the outer ends of the drive projections, the improvement which consists in the provision of means flexibly connecting the drive projections with the adjacent ends of the release levers, comprising generally U-shaped return link members, one associated with each lever and related drive projection, having the cross-portion of the U straddling a portion of the end of the lever permitting pivotal movement of the latter and having the arms of the U extending toward the projection and attached to the opposite ends of an elongated spring plate that is rigidly supported intermediate its ends on the drive projection in transverse relation thereto, the cross-portion of the U being resilient and bowed toward the lever and being subjected to deflection in the direction of straightening in the connection of the arms of the link with the plate, and the end portions of the plate being also sprung toward the lever in the connection of the arms of the link with the plate, so that the lever is pivotally connected in spring-tensioned, close-coupled relation to the drive projection and the pressure plate will be positively retracted by the levers upon depression of the other ends thereof, the spring-tensioned pivotal connections frictionally resisting lateral movement of the drive projections relative to the levers to prevent hammering of the projections in the openings without the use of any other anti-hammer means.

9. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means flexibly interconnecting the headed ends of said screws with the adjoining ends of said release levers to retract the pressure plate when the release levers are moved to disengage the clutch, said means comprising generally U-shaped return link members, one associated with each lever and related screw head, having the cross-portion of the U straddling a portion of the end of the lever permitting pivotal movement of the latter and having the arms of the U extending toward the screw head and attached to the opposite ends of an elongated spring plate that is rigidly supported intermediate its ends under the screw head in transverse relation to the screw, the cross-portion of the U being resilient and bowed toward the lever and being subjected to deflection in the direction of straightening in the connection of the arms of the link with the plate, so that the lever is pivotally connected in spring-tensioned, close-coupled relation to the screw head and the pressure plate will be positively retracted by the levers upon depression of the other ends thereof, the spring-tensioned pivotal connections frictionally resisting lateral movement of the screw heads relative to the levers to prevent hammering of the projections in the openings without the use of any other anti-hammer means.

10. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means flexibly interconnecting the headed ends of said screws with the adjoining ends of said release levers to retract the pressure plate when the release levers are moved to disengage the clutch, said means comprising generally U-shaped return link members, one associated with each lever and related screw head, having the cross-portion of the U straddling a portion of the end of the lever permitting pivotal movement of the latter and having the arms of the U extending toward the screw head and attached to the opposite ends of an elongated spring plate that is rigidly supported intermediate its ends under the screw head in transverse relation to the screw, and the end portions of the plate being also sprung toward the lever in the connection of the arms of the link with the plate, so that the lever is pivotally connected in spring-tensioned, close-coupled relation to the screw head and the pressure plate will be positively retracted by the levers upon depression of the other ends thereof, the spring-tensioned pivotal connections frictionally resisting lateral movement of the screw heads relative to the levers to prevent hammering of the projections in the openings without the use of any other anti-hammer means.

11. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, the same having end portions disposed adjacent the outer ends of the drive projections, the improvement which consists in the provision of means flexibly connecting the drive projections with the adjacent ends of the release levers, comprising generally U-shaped return link members, one associated with each lever and related drive projection, having the cross-portion of the U straddling a portion of the end of the lever permitting pivotal movement of the latter and having the arms of the U extending toward the projection and attached to the opposite ends of an elongated plate that is rigidly supported intermediate its ends on the drive projection in transverse relation thereto, the cross-portion of the U being resilient and bowed toward the lever and being subjected to deflection in the direction of straightening in the connection of the arms of the link with the plate, so that the lever is pivotally connected in spring-tensioned, close-coupled relation to the drive projection and the pressure plate will be positively retracted by the levers upon depression of the other ends thereof, the spring-tensioned pivotal connections frictionally resisting lateral movement of the drive projections relative to the levers to prevent hammering of the projections in the openings without the use of any other anti-hammer means, the arms of the U being resilient and having shoulders projecting inwardly from their free end portions which are adapted to be engaged with snap action behind the end portions of the plate when the arms are spread apart in moving the shouldered end portions into coupling position.

12. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, the same having end portions disposed adjacent the outer ends of the drive projections, the improvement which consists in the provision of means flexibly connecting the drive projections with the adjacent ends of the release levers, comprising generally U-shaped return link members, one associated with each lever and related drive projection, having the cross-portion of the U straddling a portion of the end of the lever permitting pivotal movement of the latter and having the arms of the U extending toward the projection and attached to the opposite ends of an elongated spring plate that is rigidly supported intermediate its ends on the drive projection in transverse relation thereto, the cross-portion of the U being resilient and bowed toward the lever and being subjected to deflection in the direction of straightening in the connection of the arms of the link with the plate, and the end portions of the plate being also sprung toward the lever in the connection of the arms of the link with the plate, so that the lever is pivotally connected in spring-tensioned, close-coupled relation to the drive projection and the pressure plate will be positively retracted by the levers upon depression of the other ends thereof, the spring-tensioned pivotal connections frictionally resisting lateral movement of the drive projections relative to the levers to prevent hammering of the projections in the openings without the use of any other anti-hammer means, the arms of the U being resilient and having shoulders projecting inwardly from their free end portions which are adapted to be engaged with snap action behind the end portions of the plate when the arms are spread apart in moving the shouldered end portions into coupling position.

13. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means flexibly interconnecting the headed ends of said screws with the adjoining ends of said release levers to retract the pressure plate when the release levers are moved to disengage the clutch, said means comprising generally U-shaped return link members, one associated with each lever and related screw head, having the cross-portion of the U straddling a portion of the end of the lever permitting pivotal movement of the latter and having the arms of the U extending toward the screw head and attached to the opposite ends of an elongated spring plate that is rigidly supported intermediate its ends under the screw head in transverse relation to the screw, the cross-portion of the U being resilient and bowed toward the lever and being subjected to deflection in the direction of straightening in the connection of the arms of the link with the plate, so that the lever is pivotally connected in spring-tensioned, close-coupled relation to the screw head and the pressure plate will be positively retracted by the levers upon depression of the other ends thereof, the spring-tensioned pivotal connections frictionally resisting lateral movement of the screw heads relative to the levers to prevent hammering of the projections in the openings without the use of any other anti-hammer means, the arms of the U being resilient and having shoulders projecting inwardly from their free end portions which are adapted to be engaged with snap action behind the end portions of the plate when the arms are spread apart in moving the shouldered end portions into coupling position.

14. In a clutch comprising, in combination, a flywheel, a back plate carried thereby, a driven member, an axially movable pressure plate having a plurality of rearwardly extending drive projections in circumferentially spaced relation received in registering openings provided therefor in said back plate with a fit close enough to transmit drive but with sufficient clearance to permit relative sliding movement, spring means to transmit engaging pressure to said pressure plate, and release levers pivoted relative to the back plate for causing disengagement of the clutch, there being adjustable clearance takeup screws threaded in said drive projections and having headed ends projecting rearwardly therefrom and arranged to be engaged by end portions of the levers, the improvement which consists in the provision in combination with said adjustable screws of means flexibly interconnecting the headed ends of said screws with the adjoining ends of said release levers to retract the pressure plate when the releae levers are moved to disengage the clutch, said means comprising generally U-shaped return link members, one associated with each lever and related screw head, having the cross-portion of the U straddling a portion of the end of the lever permitting pivotal movement of the latter and having the arms of the U extending toward the screw head and attached to the opposite ends of an elongated spring plate that is rigidly supported intermediate its ends under the screw head in transverse relation to the screw, and the end portions of the plate being also sprung toward the lever in the connection of the arms of the link with the plate, so that the lever is pivotally connected in spring-tensioned, close-coupled relation to the screw head and the pressure plate will be positively retracted by the levers upon depression of the other ends thereof, the spring-tensioned pivotal connections frictionally resisting lateral movement of the screw heads relative to the levers to prevent hammering of the projections in the openings without the use of any other anti-hammer means, the arms of the U being resilient and having shoulders projecting inwardly from their free end portions which are adapted to be engaged with snap action behind the end portions of the plate when the arms are spread apart in moving the shouldered end portions into coupling position.

References Cited in the file of this patent

UNITED STATES PATENTS

| | | |
|---|---|---|
| 705,496 | Wales | July 22, 1902 |
| 1,609,448 | Wemp | Dec. 7, 1926 |
| 2,103,743 | Doty | Dec. 28, 1937 |
| 2,201,340 | Hunt | May 21, 1940 |
| 2,214,780 | Thelander | Sept. 17, 1940 |
| 2,216,219 | Wiley | Oct. 1, 1940 |
| 2,265,947 | Tinnerman | Dec. 9, 1941 |
| 2,295,444 | Woodward | Sept. 8, 1942 |
| 2,324,654 | Tinnerman et al. | July 20, 1943 |
| 2,444,964 | Thelander | July 13, 1948 |
| 2,641,344 | Banker | June 9, 1953 |
| 2,656,577 | Carbary | Oct. 27, 1953 |